United States Patent
Chazal et al.

(10) Patent No.: US 11,128,162 B2
(45) Date of Patent: Sep. 21, 2021

(54) METHOD AND SYSTEM FOR ALLOCATING A POWER REQUEST TO A PLURALITY OF BATTERIES CONNECTED IN PARALLEL

(71) Applicant: RENAULT s.a.s, Boulogne-Billancourt (FR)

(72) Inventors: Yann Chazal, Paris (FR); Philippe Toussaint, Versailles (FR); Do-Hieu Trinh, Fontenay-le-Fleury (FR); Mathieu Umlawski, Versailles (FR)

(73) Assignee: RENAULT s.a.s., Boulogne-Billancourt (FR)

( * ) Notice: Subject to any disclaimer, the term of this patent is extended or adjusted under 35 U.S.C. 154(b) by 719 days.

(21) Appl. No.: 15/554,619

(22) PCT Filed: Feb. 29, 2016

(86) PCT No.: PCT/FR2016/050453
§ 371 (c)(1),
(2) Date: Aug. 30, 2017

(87) PCT Pub. No.: WO2016/139412
PCT Pub. Date: Sep. 9, 2016

(65) Prior Publication Data
US 2018/0041067 A1 Feb. 8, 2018

(30) Foreign Application Priority Data

Mar. 3, 2015 (FR) ..................... 1551760

(51) Int. Cl.
*H02J 7/34* (2006.01)
*H02J 7/00* (2006.01)
(Continued)

(52) U.S. Cl.
CPC .............. *H02J 7/34* (2013.01); *H02J 7/0018* (2013.01); *H02J 7/0021* (2013.01);
(Continued)

(58) Field of Classification Search
CPC .................................. H02J 7/34; H02J 7/0021
See application file for complete search history.

(56) References Cited

U.S. PATENT DOCUMENTS

| | | | |
|---|---|---|---|
| RE40,663 E * | 3/2009 | Silverman | H01M 2/20 307/139 |
| 8,406,936 B1 * | 3/2013 | Borumand | H02J 7/0047 700/295 |

(Continued)

FOREIGN PATENT DOCUMENTS

| | | |
|---|---|---|
| FR | 1.551.760 | 12/1968 |
| GB | 2494187 | 3/2013 |

OTHER PUBLICATIONS

International Search Report dated Jul. 6, 2016, in PCT/FR2016/050453 filed Feb. 29, 2016.

(Continued)

*Primary Examiner* — David V Henze-Gongola
*Assistant Examiner* — Tarikh Kanem Rankine
(74) *Attorney, Agent, or Firm* — Oblon, McClelland, Maier & Neustadt, L.L.P.

(57) ABSTRACT

The invention relates to a method and a system for allocating a power request $P_{REQ}$ to a plurality of batteries connected in parallel in an electrical energy storage system. According to the invention, the allocation system comprises a global control system that can determine a combination of batteries from said plurality of batteries, which is optimized to respond to the power request using the highest possible number of batteries, and allocate a power level to each of the batteries of said optimized combination.

6 Claims, 1 Drawing Sheet

(51) Int. Cl.
*H02J 3/32* (2006.01)
*H02J 3/14* (2006.01)

(52) U.S. Cl.
CPC ............... *H02J 7/0068* (2013.01); *H02J 3/14* (2013.01); *H02J 3/32* (2013.01); *H02J 7/007* (2013.01); *H02J 7/00047* (2020.01); *H02J 7/0048* (2020.01)

(56) References Cited

U.S. PATENT DOCUMENTS

| | | | | |
|---|---|---|---|---|
| 2003/0071523 | A1* | 4/2003 | Silverman | H01M 2/20 307/150 |
| 2004/0160213 | A1 | 8/2004 | Stanesti et al. | |
| 2006/0075266 | A1 | 4/2006 | Popescu-Stanesti et al. | |
| 2006/0145658 | A1* | 7/2006 | Wang | H02J 7/0072 320/107 |
| 2008/0263375 | A1* | 10/2008 | Sundstrom | G06F 1/3203 713/320 |
| 2008/0306637 | A1* | 12/2008 | Borumand | H02J 7/0047 701/3 |
| 2009/0094473 | A1* | 4/2009 | Mizutani | G06F 1/3203 713/340 |
| 2009/0278499 | A1* | 11/2009 | Niculae | H02J 7/02 320/132 |
| 2010/0261048 | A1* | 10/2010 | Kim | H02J 7/0024 429/150 |
| 2011/0025258 | A1 | 2/2011 | Kim et al. | |
| 2012/0153722 | A1* | 6/2012 | Nazarian | B60L 58/15 307/23 |
| 2012/0212183 | A1* | 8/2012 | Yamada | H02J 3/32 320/126 |
| 2012/0242148 | A1* | 9/2012 | Galati | H02J 3/14 307/39 |
| 2012/0248868 | A1* | 10/2012 | Mobin | B60L 53/80 414/589 |
| 2013/0057076 | A1 | 3/2013 | Lavender | |
| 2013/0108898 | A1* | 5/2013 | Potts | H02J 7/0013 429/50 |
| 2013/0229057 | A1* | 9/2013 | Taima | H02J 7/0068 307/19 |
| 2014/0001863 | A1* | 1/2014 | Zhang | G21D 1/02 307/66 |
| 2014/0173299 | A1* | 6/2014 | McKnight | G06F 9/5094 713/300 |
| 2014/0266061 | A1* | 9/2014 | Wachal | H02J 7/0022 320/134 |
| 2015/0002102 | A1* | 1/2015 | Ohashi | H02J 7/0063 320/135 |
| 2015/0115720 | A1* | 4/2015 | Hysell | H02J 9/065 307/65 |
| 2015/0194707 | A1* | 7/2015 | Park | H01M 10/4207 429/50 |
| 2015/0222124 | A1* | 8/2015 | Van Amerongen | H02J 7/025 700/287 |
| 2015/0318565 | A1* | 11/2015 | Ryu | H01M 8/04626 429/430 |
| 2016/0079755 | A1* | 3/2016 | Triebel | H02J 3/32 307/52 |
| 2016/0190808 | A1* | 6/2016 | Lee | H02J 3/381 307/24 |
| 2016/0197514 | A1* | 7/2016 | Li | H02J 7/007 700/291 |
| 2016/0226287 | A1* | 8/2016 | Djan-Sampson | G05B 19/041 |
| 2016/0254671 | A1* | 9/2016 | Cutright | G05B 19/048 700/295 |
| 2017/0047741 | A1* | 2/2017 | Narla | H02J 3/32 |
| 2017/0315182 | A1* | 11/2017 | Hanada | H01M 10/482 |
| 2018/0041067 | A1* | 2/2018 | Chazal | H02J 7/0068 |
| 2018/0145511 | A1* | 5/2018 | Biellmann | H02J 11/00 |

OTHER PUBLICATIONS

French Search Report dated Jan. 15, 2016 in French Application 1551760 filed Mar. 3, 2015.

* cited by examiner

METHOD AND SYSTEM FOR ALLOCATING A POWER REQUEST TO A PLURALITY OF BATTERIES CONNECTED IN PARALLEL

BACKGROUND

The present invention relates generally to energy storage and delivery systems using a plurality of batteries connected in parallel, and more precisely to a method and a system for allocating a power request to a plurality of batteries included in such an energy storage and delivery system.

Electrical energy storage requirements are expanding worldwide. Developed systems have to meet demands originating from a more comprehensive external energy management system in order to intermittently store a certain amount of energy, corresponding for example to a particular pricing opportunity or to an unforeseen surplus of renewable-origin production, or in order to provide assistance to the electricity grid by intermittently delivering the stored energy, for example in order to smooth a consumption point, or in order to compensate for a deficit in the expected production of renewable energy.

These requirements are expressed in the form of an absorption power or a delivery power $P_{REQ}$, as the case may be, demanded of the storage system for a given duration, and therefore of an associated amount of energy.

By nature, these requirements are not necessarily orderly (alternation of storage and release phases) and may exceed the necessarily limited capacities of a storage system. Thus, for example, when the batteries of a storage system are all completely charged, the power absorbable, and a fortiori the energy absorbable by the system, are zero. The system is therefore no longer available for an additional absorption power request.

Some known architectures include batteries that are linked directly in parallel to one and the same electrical bus. The drawback of these architectures lies in the fact that only the overall power is able to be controlled and be distributed between the batteries in accordance with their internal impedance. In this case, the battery that has aged most in the system will first cause the usable power to be limited, and thus prevent the full capabilities of the other batteries from being exploited.

Other preferred architectures comprise a plurality of batteries connected in parallel but able to be handled individually.

Document US 2012/0249048 describes for example an architecture of this kind in which it is possible to choose one or more batteries to operate in order to meet a power request. The main drawback of the system described in this document is that it endeavors to meet the request, irrespective of preserving the overall availability of the system.

BRIEF SUMMARY

The aim of the present invention is, inter alia, to mitigate the above drawback.

To achieve this, one subject of the invention is a method for allocating a power request $P_{REQ}$ to a plurality of batteries connected in parallel, the method including:
- a step of determining a combination of batteries, from said plurality of batteries, that is optimized to meet the power request by using the greatest possible number of batteries;
- a step of allocating a power level to each of the batteries of said optimized combination.

According to certain possible additional features:
- the step of determining an optimized combination of batteries determines said combination on the basis of a minimum power Pmin(i), required for operation, that is associated with each battery i;
- the step of determining an optimized combination of batteries determines the combination including the greatest number of batteries i for which the following relationship is satisfied:

$P_{REQ} > \Sigma P_{min}(i)$ where $P_{min}(i)$ is the minimum power associated with each battery i of the combination.
- the step of determining an optimized combination of batteries advantageously includes, on the basis of an original combination including all of the batteries i, successively removing one battery from the combination until the following relationship is satisfied:

$P_{REQ} > \Sigma P_{min}(i)$

- the batteries are preferably removed successively in decreasing order of their associated minimum operating power;
- the step of determining an optimized combination of batteries may include a preliminary sub-step of prioritization in which it is prescribed that one or more batteries, termed priority batteries, of the plurality of batteries form part of the optimized combination;
- the following relationship may be prescribed for each priority battery i:

$P_{min}(i) = P_{max}(i)$ in which $P_{max}(i)$ is the maximum power possible for a battery i.
- the step of allocating a power level to each of the batteries of said optimized combination may include determining, for each battery i of the combination, a power P(i) according to the relationship:

$P(i) = P_{min}(i) + (M(i)/\Sigma M(i)) * (P_{REQ} - \Sigma P_{min}(i))$ in which M(i) is the operating margin of the battery i.
- the method preferably comprises a preliminary step during which the power request $P_{REQ}$ is compared with the minimum power required for the batteries to operate. The preliminary step may include determining whether the following relationship is satisfied:

$P_{REQ} > \text{Min}(P_{min}(i))$ where $P_{min}(i)$ is the minimum power required for a battery i to operate.

Another subject of the present invention is a system for allocating a power request $P_{REQ}$ to a plurality of batteries, connected in parallel, of an electrical energy storage system, including an overall control system able to:
- determine a combination of batteries, from said plurality of batteries, that is optimized to meet the power request by using the greatest possible number of batteries;
- allocate a power level to each of the batteries of said optimized combination.

BRIEF DESCRIPTION OF THE DRAWINGS

The invention and the advantages that it affords will be better understood in the light of the following description, given with reference to the appended figures, in which.

DETAILED DESCRIPTION

Figure 1:
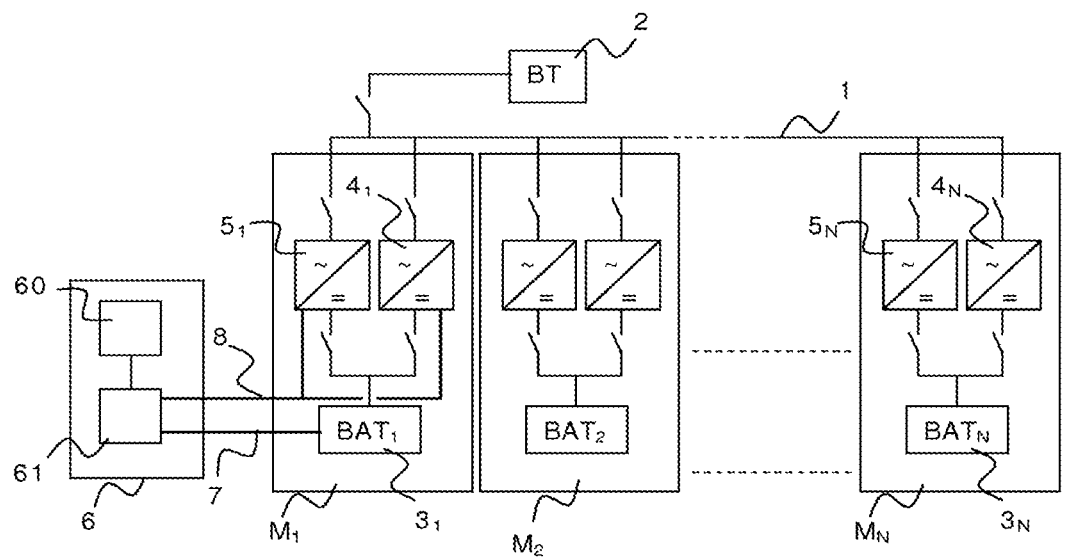
FIG. 1 schematically illustrates an example of an architecture for allocating a power request to a plurality of batteries connected in parallel, in accordance with the invention.

With reference to FIG. 1, what is under consideration is an electrical energy storage and delivery system including N modules $M_1$ to $M_N$ connected in parallel on one and the same line, for example an electrical bus 1, which is itself linked to the low-voltage electricity grid 2. The number N of modules is not limited in theory, and varies between 2 and 12 in practice. Each module $M_i$ includes a battery $3_i$ and associated controllable power electronics formed primarily:

on the one hand, by an inverter $4_i$ that makes it possible to discharge the battery $3_i$, and therefore to deliver a certain amount of energy, and on the other hand, by a charger $5_i$ that makes it possible to charge the battery $3_i$ with electricity from the grid 2, and therefore to store a certain amount of energy.

So as not to needlessly overload FIG. 1, only the essential elements of the storage and delivery modules $M_i$ and $M_N$ bear references in this figure.

The architecture furthermore includes an overall control system 6 that makes it possible to:

handle each module $M_i$ independently so as to make it produce a chosen power that is compatible with the present limits of the battery under consideration, coordinate the power demanded from each module $M_i$ in order to meet an overall request received by the storage system.

In the example shown, the overall control system 6 essentially includes a control module 60 and an interface module 61 for linking the system 6, preferably via serial data links 7 and 8 of CAN or ModBus type, to each battery $3_i$ on the one hand, and to each inverter $4_i$ and charger 5; on the other hand. For the sake of simplification, here again only the links between the interface module 61 and the energy storage and delivery module $M_i$ have been shown.

Numerous switches present in the figure illustrate the fact that each battery is able to be handled independently so as to store electrical energy originating from the grid 2 or so as to deliver energy stored beforehand to this grid 2, all under the control of the overall control system 6.

In the case of a storage system formed internally of a plurality of independently handleable batteries (that is to say that are not linked to one and the same electrical bus), the amounts of energy that are available are themselves also limited.

However, the present invention is based on the fact that it is possible to prevent, as much as possible, some of these batteries from prematurely reaching an extreme operating state (full or empty for example) in which they would become unavailable. Specifically, their unavailability causes not only the energy that is available, but also the power that is able to be mobilized, to be limited. It is therefore important to handle the charging of each battery in such a way as to preserve the usable powers for the storage system as much as possible.

In the remainder of the disclosure, the following notations will be used for each battery module $P_{min}(i)$ is the minimum power required for the module to operate. This minimum power corresponds to a minimum current below which it is not possible to measure the current with sufficient accuracy to carry out a correct regulation. This minimum power is an item of manufacturer data that may advantageously be stored in a table (not shown) of the overall control system $P_{max}(i)$ is the maximum power possible for the module to operate. This power corresponds to the minimum value between the maximum power acceptable to the power electronics of each module $M_i$ and the maximum power acceptable to the battery. This maximum power is variable, in particular depending on the temperature. Each controller (not shown) of the battery $3_i$, and of the power electronics $4_i$, $5_i$, sends its maximum acceptable power value via the links 7, 8. The overall control system 6 is therefore in a position to know the value $P_{max}(i)$;

SOC(i) is the state of charge of the battery in the module $M_i$. Each controller (not shown) of the battery $3_i$ sends the value of the state of charge via the link 7;

M(i) is the margin of the module $M_i$, and corresponds to the difference between Pmax(i) and Pmin(i);

P(i) is the power attributed to each module $M_i$ by the overall control system 6 in order to meet a power request $P_{REQ}$, whether this be an energy storage or an energy delivery request.

Figure 2:
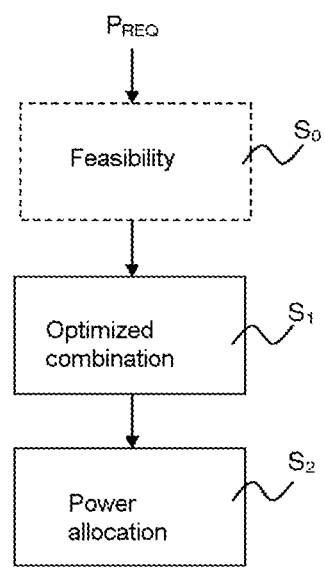
FIG. 2 shows an example of a sequence of steps that may be implemented in accordance with the present invention.

The method for allocating the powers P(i) between the modules $M_i$, implemented by the overall control system 6 in order to meet a power request $P_{REQ}$, has the objective of optimizing the availability of the modules $M_i$ in order to be able to provide the fullest possible service at any point in time. This method will proceed in a plurality of steps, which are outlined schematically in FIG. 2, including:

an optional feasibility step $S_0$;

a step $S_1$ of determining an optimized combination of modules from the plurality of modules $M_i$, so as to use the greatest possible number of modules to meet the request; and a step $S_2$ during which each module $M_i$ of the previous optimized combination is allocated a power P(i).

The feasibility step $S_0$ makes it possible to ensure that the received request $P_{REQ}$ does indeed fall within the physical capabilities of the electrical energy storage and delivery system. As indicated above, there exists a minimum power value $P_{min}(i)$ to be able to start up a module $M_i$. More than being a physical constraint on the components of the module $M_i$, this value corresponds to a minimum that is prescribed in order to ensure reliability when the accepted requests are performed. Specifically, excessively low powers would not make it possible to ensure sufficient accuracy to meet the satisfaction criteria for the proposed service.

A request is considered to be unable to be performed if the power demanded $P_{REQ}$ does not meet this criterion for any of the modules that make up the system.

The feasibility criterion may therefore be described in the following form: the power demanded $P_{REQ}$ in the request must be greater than the smallest of the minimum powers required for one of the modules that make up the system to operate. In other words, it is necessary to have at least one module $M_i$ able to perform the request. This is reflected by the following relationship:

$$P_{REQ} > \mathrm{Min}(P_{min}(i))$$

If, during step $S_0$, the control module 60 determines that the previous relationship is not satisfied, then the request will be considered to be unable to be performed and will be denied. In the opposite case, the method continues with step 61.

During this step, the overall control system 6 has to find, from the plurality of modules $M_i$, the best possible combination that will make it possible to simultaneously use as many modules $M_i$ as possible to meet the request. To achieve this, a certain number of criteria may advantageously be inspected:

According to a first criterion, and in addition to the main objective of optimizing the availability provided by the system, it is possible to prescribe priorities for certain modules $M_i$. For example, this may involve giving priority to the batteries whose residual capacity it is desired to test, this type of test requiring said battery to be completely charged and then completely discharged, to the maximum of its power. In one particular entirely non-limiting case, it will be prescribed that a priority module will have to use its maximum power for each performance.

In order words, a priority module $M_i$ will be such that:

$$P_{min}(i)=P_{max}(i)$$

In other more general cases, an operating power $P_{choi}(i)$ will be prescribed for a priority module $M_i$, so as to have the relationship:

$$P_{min}(i)=P_{max}(i)=P_{choi}(i)$$

In a sub-step of step $S_i$, it is advantageously checked that what are termed the 'priority' module(s) may indeed be used to perform the received request, which we already know, through step $S_0$, is able to be performed. The first test to be carried out in this context is based on the same consideration as before, but taking into consideration the characteristics of the priority module(s) as an additional constraint. Specifically, the objective is to see whether, using the priority module(s), the request is still able to be performed:

$$P_{REQ} > \text{Sum}(P_{Choi}(j)) + \text{Min}(P_{min}(i))$$

where i is other than j.

By way of non-limiting example, let us consider that only the module $M_i$ is a priority module for which $P_{min}(1)=P_{max}(1)$ is prescribed.

The previous relationship that it will be necessary to satisfy then becomes:

$$P_{REQ} > P_{Choi}(1) + \text{Min}(P_{min}(i))$$

where i is other than 1.

This means ensuring that, if we use the priority module $M_1$, the 'remainder' of the request, which consists of the difference between the power demanded $P_{REQ}$ and the power of the priority module $P_{max}(1)$, is still able to be performed by at least one of the other modules.

If the control module 60 determines that the previous relationship is not satisfied, the priority module will not be considered when allocating the powers, meaning, in other words, that the module $M_1$ will be excluded from the optimized combination. In the opposite case, the priority module $M_1$ will inevitably be used when allocating the powers. It will therefore obligatorily form part of the optimized combination that is determined at the end of step $S_1$, and will no longer be able to be removed from said combination.

Once the priority modules, if they exist, have been processed, step $S_1$ continues to look for the best possible combination in terms of the number of modules in order to comply with the overall objective of residual availability of the system, the overall control system 6 will attempt, in accordance with the invention, to involve as many modules as possible (outside of the previous priority criteria). The first test consists in checking whether all of the modules are able to be put into service, in other words whether the request $P_{REQ}$ is indeed greater than the sum of the minimum powers required for each module to operate (depending on the result of the previous sub-step, the priority systems are or are not considered in the calculation). This is reflected by the following relationship:

$$P_{REQ} > \Sigma P_{MIN}(i)$$

If the control module 60 determines that this relationship is satisfied, all of the modules will be put into service, and the control module 60 will be able to move on to the following step $S_2$ to calculate the power allocated to each.

In the opposite case, the modules are successively removed from the calculation until a positive response to the previous test is achieved. It is recalled that the removal may not relate to a priority module. From the remaining non-priority modules, the removals are defined in a certain order, preferably by removing one module at each iteration, the modules being removed in decreasing order of $P_{min}(i)$, that is to say starting with the highest $P_{min}$ from the non-priority modules.

Additional removal criteria may also be used, in particular in situations where two given modules have very close $P_{min}$ values (typically +/−200 W). In this case, it will be preferred to remove the module $M_i$ whose battery has a state of charge SOC(i) that would encourage faster ageing. To achieve this, the overall control system 6 has a table (not shown) that indicates the zones of ageing for each battery $3_i$. Depending on the nature of the request (storage or delivery), the system 6 will be able to exclude the battery whose state-of-charge value is the furthest from the critical SOC values.

By way of example, let us consider that the state of charge of a first module 1 is 30%, that the state of charge of a second module is 70% and that the critical value for these two systems is 50%. The difference between the SOC of the modules and the critical value is the same (20%). In this case, we consider the nature of the request. If it is a storage request, this would increase the state of charge of the chosen module. The first module would then become closer to the critical value, while the second module would move away therefrom. We will then choose to preserve the second module. The reasoning is the same in the case of a delivery request, but in this case we will choose to preserve the first module.

At the end of step $S_i$, the overall control system 6 therefore has the optimized combination of the modules that will need to be used to meet the request $P_{REQ}$.

The last step $S_2$ consists in determining the power P(i) that it will be necessary to allocate to each module $M_i$ of the combination.

In this case, this involves calculating, for each module $M_i$ of the combination, a contribution that will be equal to its minimum operating power $P_{min}(i)$ added to a power that is proportional to the power margin M(i) provided by the module $M_i$ in question. It is recalled that the power margin of a module denotes the range of its operating capacity, in other words the difference between its maximum and minimum operating powers:

$$M(i)=P_{max}(i)-P_{min}(i)$$

M(i)=0 for a priority module $M_i$.

The additional portion of power allocated to a module therefore corresponds to the ratio between the margin provided by the module in question and the total margin provided by all of the modules present in the retained combination (this ratio then being applied to the 'remaining' power of the request, once all of the required minimum powers $P_{min}$ have been allocated). The final allocation formula for each module $M_i$ of the retained combination may therefore be expressed in the form:

$$P(i)=P_{min}(i)+(M(i)/\Sigma M(i))*(P_{REQ}-\Sigma P_{min}(i))$$

where i is representative of the modules $M_i$ retained in the combination.

The power allocation principle that is described above and associated with the architecture of FIG. 1, in which each battery is able to be handled independently, makes it possible to use the potential of each battery to the maximum.

In addition, even if a module is unavailable, for example because of a maintenance operation on a battery, the system continues to operate with the batteries that are still available, by optimally reallocating the requests.

The system is furthermore easy to adapt. Thus, if the storage requirements of an installation evolve and increase, it is easy to add an additional storage and delivery module, while preserving the same allocation logic. If it proves necessary to change a battery in a subsystem, the same allocation logic will take into account limits communicated by the new battery, so as to adjust the distribution.

The invention may be applied to any multi-battery storage system, independently of the origin of the batteries and of the purpose of the system.

The invention claimed is:

1. A method for allocating a power request $P_{REQ}$ to a plurality of batteries connected in parallel to operate to meet the power request, the method including:
    determining a combination of batteries, from said plurality of batteries, that is optimized to meet the power request by using the greatest possible number of batteries, said determining including:
        calculating a first sum of a minimum power required to operate for all of the batteries of a group including said plurality of batteries,
        when the first sum is less than the power request, selecting all of the batteries of said group to operate,
        when the first sum is greater than the request, removing a battery from the group and calculating a second sum of the minimum power required to operate for all of the batteries remaining in the group,
        when the second sum is less than the power request, selecting all of the batteries remaining in said group to operate, and
        when the second sum is greater than the request, successively removing batteries from the group until a sum of the minimum power required to operate for all of the batteries remaining in the group to operate is less than the power request; and
    allocating a portion of the power request Pi to be supplied by each of the batteries i of said optimized combination according to the relationship:

$$P(i)=P_{min}(i)+(M(i)/\Sigma M(i))*(P_{REQ}-\Sigma P_{min}(i))$$

in which $P_{min}(i)$ is the minimum power required to operate the battery i, M(i) is a difference between a maximum power possible for the battery i and the minimum power required to operate the battery i, and $P_{REQ}$ is the power request.

2. The method as claimed in claim 1, wherein the batteries are removed successively in decreasing order of their associated minimum operating power.

3. The method as claimed in claim 1, wherein the determining includes a preliminary sub-step of prioritization in which one or more batteries, termed priority batteries, of the plurality of batteries form part of the optimized combination.

4. The method as claimed in claim 1, further comprising, prior to the determining, comparing the power request $P_{REQ}$ with the minimum power required for the batteries to operate.

5. The method as claimed in claim 4, wherein said comparing includes determining whether the following relationship is satisfied:

$$P_{REQ}>\text{Min}(P_{min}(i))$$

where $P_{min}(i)$ is the minimum power required for a battery i to operate.

6. A system for allocating a power request $P_{REQ}$ to a plurality of batteries, connected in parallel, of an electrical energy storage system to operate to meet the power request, including an overall control system configured to:
    determine a combination of batteries, from said plurality of batteries, that is optimized to meet the power request by using the greatest possible number of batteries; and
    allocate a portion of the power request Pi to be supplied by each of the batteries i of said optimized combination according to the relationship:

$$P(i)=P_{min}(i)+(M(i)/\Sigma M(i))*(P_{REQ}-\Sigma P_{min}(i))$$

in which $P_{min}(i)$ is the minimum power required to operate the battery i, M(i) is a difference between a maximum power possible for the battery i and the minimum power required to operate the battery i $P_{REQ}$ is the power request,
    wherein, in order to determine the combination of batteries, the overall control system is configured to:
        calculate a first sum of a minimum power required to operate for all of the batteries of a group including said plurality of batteries,
        when the first sum is less than the power request, select all of the batteries of said group to operate,
        when the first sum is greater than the request, remove a battery from the group and calculating a second sum of the minimum power required to operate for all of the batteries remaining in the group,
        when the second sum is less than the power request, select all of the batteries remaining in said group to operate, and
        when the second sum is greater than the request, successively remove batteries from the group until a sum of the minimum power required to operate for all of the batteries remaining in the group to operate is less than the power request.

* * * * *